United States Patent [19]

Ciccarelli

[11] Patent Number: 4,623,606
[45] Date of Patent: Nov. 18, 1986

[54] TONER COMPOSITIONS WITH NEGATIVE CHARGE ENHANCING ADDITIVES

[75] Inventor: Roger N. Ciccarelli, Rochester, N.Y.

[73] Assignee: Xerox Corporation, Stamford, Conn.

[21] Appl. No.: 822,186

[22] Filed: Jan. 24, 1986

[51] Int. Cl.$^4$ .............................................. G03G 9/10
[52] U.S. Cl. .................................................. 430/110
[58] Field of Search ...................................... 430/110

[56] References Cited

U.S. PATENT DOCUMENTS

| | | | |
|---|---|---|---|
| 2,775,581 | 12/1956 | Neier et al. | 260/145 |
| 2,871,233 | 1/1959 | Pfitzner et al. | 260/151 |
| 2,891,938 | 6/1959 | Schetty | 260/145 |
| 2,891,939 | 6/1959 | Schetty | 260/145 |
| 2,933,489 | 4/1960 | Biedermann et al. | 260/145 |
| 4,053,462 | 10/1977 | Beffa et al. | 260/145 B |
| 4,314,937 | 2/1982 | Beffa | 260/145 |
| 4,404,271 | 9/1983 | Kawagishi et al. | 430/110 |
| 4,562,136 | 12/1985 | Inoue et al. | 430/110 X |
| 4,563,409 | 1/1986 | Suzuki et al. | 430/110 X |

*Primary Examiner*—John D. Welsh
*Attorney, Agent, or Firm*—E. O. Palazzo

[57] ABSTRACT

Disclosed is negatively charged toner composition comprised of resin particles, pigment particles, and as a charge enhancing additive an iron complex compound of the following formula:

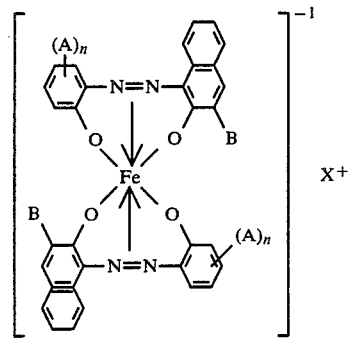

wherein A is independently selected from the group consisting of hydrogen, alkyl substituents, halogen, nitro, and alkoxy; n is the number 1, 2 or 3; X is a cation; and B is of the formula

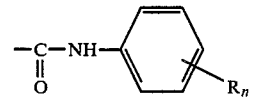

wherein R is selected from the group consisting of hydrogen, alkyl, halogen, nitro, and alkoxy; and n is as defined herein.

30 Claims, No Drawings

TONER COMPOSITIONS WITH NEGATIVE CHARGE ENHANCING ADDITIVES

BACKGROUND OF THE INVENTION

The invention is generally directed to toner compositions, and more specifically, the present invention is directed to developer and toner compositions containing therein charge enhancing additives, which impact a negative charge to the toner resin particles. In one embodiment there is provided in accordance with the present invention toner compositions comprised of resin particles, pigment particles, and iron complex charge enhancing additives, including the iron complex of azo dyes prepared from coupling dye diazotized substituted amino phenols with substituted naphthols. The aforementioned toner compositions can be selected for the development of electrostatic latent images inclusive of color images. Additionally, these additives are believed to be nontoxic in that, for example, they would generate an acceptable negative Ames test. Developer compositions with charge enhancing additives, which impart a positive charge to the toner resin are well known. Thus, for example, there is described in U.S. Pat. No. 3,893,935 the use of quaternary ammonium salts as charge control agents for electrostatic toner compositions. There is also described in U.S. Pat. No. 2,986,521 reversal developer compositions comprised of toner resin particles coated with finely divided colloidal silica. According to the disclosure of this patent, the development of electrostatic latent images on negatively charged surfaces is accomplished by applying a developer composition having a positively charged triboelectric relationship with respect to the colloidal silica.

Also, there is disclosed in U.S. Pat. No. 4,338,390, the disclosure of which is totally incorporated herein by reference, developer compositions having incorporated therein as charge enhancing additives organic sulfate and sulfonates. Further, there is disclosed in U.S. Pat. No. 4,298,672 positively charged toner compositions with resin particles and pigment particles, and as a charge enhancing additive alkyl pyridinium compounds. Additionally, other patents disclosing positively charged toner compositions with charged control additives include U.S. Pat. Nos. 3,944,493; 4,007,293; 4,079,014 and 4,394,430.

Moreover, toner compositions with negative charge enhancing additives are known, reference for example U.S. Pat. Nos. 4,411,974 and 4,206,064, the disclosures of which are totally incorporated herein by reference. The U.S. Pat. No. 4,411,974 patent discloses negatively charged toner compositions comprised of resin particles, pigment particles, and as a charge enhancing additive ortho-halo phenyl carboxylic acids. Similarly, there is disclosed in the '064 patent toner compositions with chromium, cobalt, and nickel complexes of salicylic acid as negative charge enhancing additives.

There is illustrated in U.S. Pat. No. 4,404,271, the disclosure of which is totally incorporated herein by reference, a complex system for developing electrostatic images with a toner which contains a metal complex represented by the formula in column 2, lines 20 to 31; and wherein ME can be chromium, cobalt or iron. Additionally, other patents disclosing various metal containing azo dyestuff structures wherein the metal is chromium or cobalt include U.S. Pat. Nos. 2,891,939; 2,871,233; 2,891,938; 2,933,489; 4,053,462 and 4,314,937. Also, in U.S. Pat. No. 4,433,040, the disclosure of which is totally incorporated herein by reference, there are illustrated toner compositions with chromium and cobalt complexes of azo dyes as negative charge enhancing additives.

Although many charge control additives are known, there continues to be a need for new additives. Specifically, there continues to be a need for additives which will impart negative charges and stable triboelectric characteristics to toner resin particles. Moreover, there continues to be a need for humidity insensitive negatively charged toner and developer compositions. Further, there is a need for charge enhancing additives which can be easily and permanently dispersed into toner resin particles. There also is a need for negatively charged toner compositions with desirable and rapid toner admix charging characteristics.

SUMMARY OF THE INVENTION

It is an object of the present invention to provide toner and developer compositions with negative charge enhancing additives.

In another object of the present invention there is provided negatively charged toner compositions useful for the development of electrostatic latent images including color images.

In yet another object of the present invention there is provided negatively charged toner compositions containing as charge enhancing additives iron complexes, which are believed to be nontoxic.

Also, in another object of the present invention there is provided a developer compositions with negatively charged toner particles, carrier particles and novel iron complex charge enhancing additives.

In yet a further object of the present invention there are provided humidity insensitive negatively charged toner compositions with desirable admix properties.

In a further object of the present invention there are provided magnetic toner composition, and colored toner compositions with negatively charged toner particles, carrier particles, and iron complex charge enhancing additives.

These and other objects of the present invention are accomplished by providing toner compositions comprised of resin particles, pigment particles and as new compositions of matter, iron complex charge enhancing additives of the following formula:

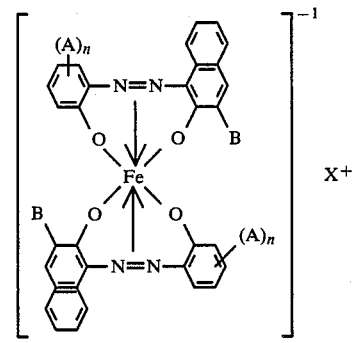

wherein A is selected from the group consisting of hydrogen, alkyl, halogen, nitro, and alkoxy; X is a cation such as hydrogen, sodium, potassium, ammonium, substituted ammonium including aliphatic, alicyclic, and heterocyclic ammonium; n is the number 1, 2 or 3; and B is of the formula

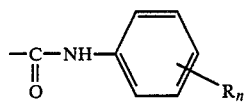

wherein R is selected from the group consisting of hydrogen, alkyl, halogen, nitro, and alkoxy; and n is as defined herein.

Illustrative examples of alkyl groups are those with from about 1 to about 20 carbon atoms inclusive of methyl, ethyl, propyl, butyl, pentyl, hexyl, octyl, nonyl, decyl, cetyl, stearyl, eicosyl, pentadecyl and the like, with methyl being preferred. Halogen substituents are chloride, bromide, fluoride and iodide. As alkoxy groups there is envisioned those of from about 1 to about 20 carbon atoms such as methoxy, ethoxy, propoxy, butoxy, pentoxy, and the like. Examples of cations include halogens, hydrogen, sodium, potassium, $NH_4$ and $NRH_3$, wherein R is an alkyl group as defined herein.

Generally, the iron complex charge enhancing additives of the present invention can be prepared by the coupling reaction of diazotized substituted amino phenols with substituted naphthols; and thereafter linking the resulting product with iron salts, such as iron sulfate. Examples of amino phenols that may be selected include dinitro amino phenol, dichloro amino phenol, and amino phenols; while illustrated examples of naphthol reactants selected for the present invention include 3-hydroxy-2-naphthanilide, and other similar naphthols of the formula as detailed on page 4 of the present application. As linking reactants, there can be selected in addition to iron sulfates, iron salicylate. Moreover, other reactants not specifically described herein can be utilized providing the objectives of the present invention are achievable.

Generally, the molar ratio of amino phenol to substituted naphthol is 1:1; and further, there is selected a molar ratio of 2:1 with respect to the linking salt, that is, about preferably, for example, 2 parts mixture of amino phenol and naphthol with 1 part of sulfate. The linking reaction is generally accomplished by heating the mixture to a temperature in excess of 100° C., and usually not above 130° C. The initial reaction of the amino phenol with the substituted naphthol generally requires no heating. Furthermore, elemental analysis was used for the purpose of identifying the resulting iron complex salts obtained.

Illustrative examples of suitable toner resins selected for the toner and developer compositions of the present invention are polyamides, epoxies, polyurethanes, vinyl resins, including homopolymers or copolymers of two or more vinyl monomers; and polymeric esterification products of a dicarboxylic acid and a diol comprising a diphenol. Vinyl monomers include styrene, p-chlorostyrene, vinyl naphthalene, unsaturated mono-olefins such as ethylene, propylene, butylene, isobutylene and the like; vinyl halides such as vinyl chloride, vinyl bromide, vinyl fluoride, vinyl acetate, vinyl propionate, vinyl benzoate, and vinyl butyrate; vinyl esters like esters of monocarboxylic acids including methyl acrylate, ethyl acrylate, n-butylacrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, and butyl methacrylate; acrylonitrile, methacrylonitrile, acrylamide, vinyl ethers, such as vinyl methyl ether, vinyl iso-butyl ether, vinyl ethyl ether, and the like; vinyl ketones such as vinyl methyl ketone, vinyl hexyl ketone, and methyl isopropenyl ketone; vinylidene halides such as vinylidene chloride, vinylidene chlorofluoride and the like; and N-vinylindole, N-vinyl pyrrolidene and the like; styrene butadiene copolymers; and mixtures thereof.

As one preferred toner resin there is elected the esterification products of a dicarboxylic acid and a diol comprising a diphenol. These resins are illustrated in U.S. Pat. No. 3,590,000, the disclosure of which is totally incorporated herein by reference. Other preferred toner resins include styrene/methacrylate copolymers, and styrene/butadiene copolymers; polyester resins obtained from the reaction of bisphenol A and propylene oxide; followed by the reaction of the resulting product with fumaric acid; and branched polyester resins resulting from the reaction of dimethylterephthalate, 1,3-butanediol, 1,2-propanediol, and pentaerythritol, styrene acrylates; and mixtures thereof. Also, waxes with a molecular weight of from about 1,000 to about 6,000 such as polyethylene, polypropylene, and paraffin can be incorporated into the toner resin particles as fuser roll release agents.

The resin particles are present in a sufficient, but effective amount, thus when 5 percent by weight of iron complex charge enhancing additive is present; and 10 percent by weight of pigment or colorant such as carbon black is contained therein, about 85 percent by weight of resin is selected. Generally, from about 0.25 weight percent to about 10 weight percent, and preferably from about 1 weight percent to about 5 weight percent of the charge enhancing additive is selected for mixing with the toner particles; however, the charge enhancing additive of the present invention can be used in various other amounts providing the objectives of the present invention are accomplished. Also, the charge enhancing additive of the present invention can be blended into the toner composition or coated on the pigment particles. When used as a coating, the charge enhancing additive of the present invention is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, carbon black, nigrosine dye, aniline blue, and mixtures thereof. The pigment, which is preferably carbon black, should be present in a sufficient amount to render the toner composition highly colored. Generally, the pigment particles are present in amounts of from about 3 percent by weight to about 20 percent by weight, based on the total weight of the toner composition, however, lesser or greater amounts of pigment particles can be selected providing the objectives of the present invention are achieved.

When the pigment particles are comprised of magnetites, which are a mixture of iron oxides ($FeOFe_2O_3$) including those commercially available as Mapico Black, they are present in the toner composition in an amount of from about 10 percent by weight to about 70 percent by weight, and preferably in an amount of from about 10 percent by weight to about 50 percent by weight.

Also encompassed within the scope of the present invention are colored toner compositions comprised of toner resin particles, carrier particles, the charge enhancing additives illustrated herein, and as pigments or colorants magenta, cyan and/or yellow particles, as well as mixtures thereof. More specifically, with regard to the production of color images utilizing a developer composition with the charge enhancing additives of the present invention, illustrative examples of magenta materials that may be selected as pigments include, for example, 2,9-dimethyl-substituted quinacridone and anthraquinone dye identified in the color index as Cl 60710, Cl Dispersed Red 15, diazo dye identified in the color index as Cl 26050, Cl Solvent Red 19, and the like. Illustrative examples of cyan materials that may be used as pigments include copper tetra-4(octadecyl sulfonamido) phthalocyanine, X-copper phthalocyanine, X-copper phthalocyanine pigment listed in the color index as Cl 74160, Cl Pigment Blue, and Anthrathrene Blue, identified in the color index as Cl 69810, Special Blue X-2137, and the like; while illustrative examples of yellow pigments that may be selected are diarylide yellow 3,3-dichlorobenzidene acetoacetanilides, a monoazo pigment identified in the color index as Cl 12700, Cl Solvent Yellow 16, a nitrophenyl amine sulfonamide identified in the color index as Foron Yellow SE/GLN, Cl Dispersed Yellow 33, 2,5-dimethoxy-4-sulfonanilide phenylazo-4'-chloro-2,5-dimethoxy aceto-acetanilide, and Permanent Yellow FGL.

The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there is admixed with the toner particles carrier components, particularly those that are capable of triboelectrically assuming an opposite polarity to that of the toner composition. Accordingly, the carrier particles of the present invention are selected so as to be of a positive polarity in order that the toner particles which are negatively charged will adhere to and surround the carrier particles. Illustrative examples of carrier particles include iron powder, steel, nickel, iron ferrites, silicon dioxide, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. Nos. 3,526,533 and 3,467,634, the disclosures of which are totally incorporated herein by reference; other known coatings; and the like.

Furthermore, the diameter of the carrier particles is generally from about 50 microns to about 1,000 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods including melt blending the toner resin particles, pigment particles or colorants, and the charge enhancing additive of the present invention; followed by mechanical attrition. Other methods include those well known in the art such as spray drying, melt dispersion, dispersion polymerization, and suspension polymerization. In one method, a solvent dispersion of the resin particles, the pigment particles, and the charge enhancing additive are spray dried under controlled conditions to result in the desired product.

Additionally, the toner and developer compositions of the present invention may be selected for use in electrostatographic imaging apparatuses containing therein conventional photoreceptors providing that they are capable of being charged positively. This usually occurs with inorganic photoreceptors, illustrative examples of which include selenium, selenium alloys, halogen doped selenium substances, and halogen doped selenium alloys. Also, the toner and developer compositions of the present invention can be used with photoreceptors that are capable of being charged negatively, such as those described in U.S. Pat. No. 4,265,990, the disclosure of which is totally incorporated herein by reference. For these, the discharged areas are developed with toner. Other similar photoreceptors can be selected providing the objectives of the present invention are achievable.

The following examples are being supplied to further define various species of the present invention, it being noted that these examples are intended to illustrate and not limit the scope of the present invention. Parts and percentages are by weight unless otherwise indicated.

EXAMPLE I

There was prepared the iron complex of 3,5-dinitro-2-hydroxyphenyl azo-2-hydroxy-3-naphthanilide by adding to a 2-liter flask 30 grams of 4,6-dinitro-2-aminophenol, 39.2 grams of 37 percent hydrochloric acid, and 650 grams of water. After cooling this mixture to 0° C., there was added 10.4 grams of sodium nitrite dissolved in 50 grams of water, followed by stirring for 2 hours at 0° C.

There was then prepared at room temperature a second solution of 39.6 grams of 3-hydroxy-2-naphthanilide dissolved in 450 grams of water with 15 grams of sodium hydroxide. The above prepared solution with the aminophenol was then added dropwise to the second naphthanilide solution at 0° C., followed by stirring until the mixture achieved room temperature. The precipitate resulting was then filtered from the solution. Subsequently, the aforementioned precipitate was dissolved in 400 grams of ethylene glycol containing therein 7.52 grams of sodium hydroxide. To the resulting mixture was added 26.5 grams of iron salicylate, followed by heating to 118° C. for two hours. The resulting mixture was then cooled to room temperature.

Followed by washing the above mixture with water, and vacuum drying in an oven, there was obtained, as determined for example by elemental analysis, the sodium salt of the following formula:

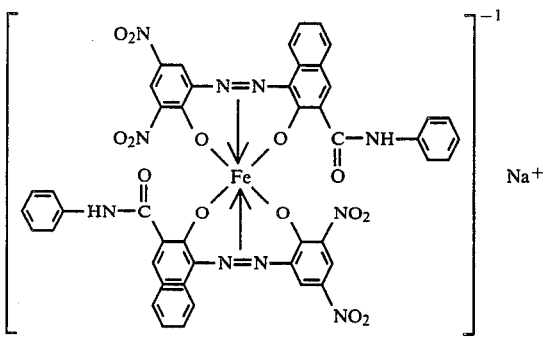

EXAMPLE II

The procedure of Example I was repeated with the exception that the mixture resulting, subsequent to the addition of 26.5 grams of iron salicylate, was washed with a 1 percent hydrogen chloride solution, followed by filtration and vacuum oven drying, thus yielding the acid form of an iron complex of the following formula:

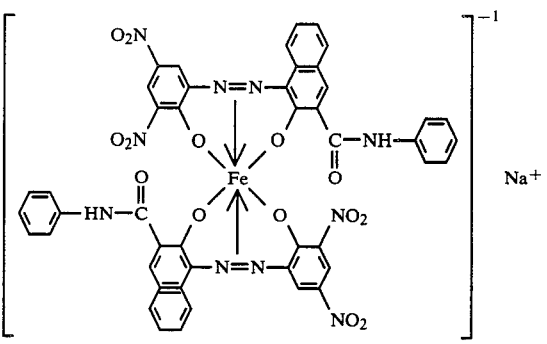

EXAMPLE III

A toner composition was prepared by melt blending at 100° C., followed by mechanical attrition, 62 percent by weight of a styrene n-butylmethacrylate copolymer (58/42), 18 percent by weight of a styrene acrylate copolymer, 10 percent by weight of the polyethylene wax available from Sanyo as Viscol-550P, 8 percent by weight of Black Pearls L carbon black, and 2 percent by weight of the iron complex charge enhancing additive prepared in accordance with Example I. Thereafter, the resulting toner composition was classified to enable removal of particles smaller than 5 microns in diameter. The triboelectric charge on the resulting toner composition, as measured against an iron powder carrier at a 1.5 percent toner concentration, this measurement occuring in the known Faraday cage apparatus, was a negative 14 microcoulombs per gram.

EXAMPLE IV

A toner composition was prepared by repeating the procedure of Example III with the exception that there was selected 2 percent by weight of the iron complex charge enhancing additive prepared in accordance with Example II in place of the iron complex of Example I. This toner composition had a triboelectric negative charge of 15 microcoulombs per gram against an iron powder carrier.

EXAMPLE V

There was prepared a toner composition by repeating the procedure of Example III with the exception that there was blended onto the surface of the toner composition 0.2 percent by weight of Aerosil R972. The resulting toner composition had a triboelectric charge thereon of a negative 14 microcoulombs per gram.

EXAMPLE VI

A toner composition was prepared by repeating the procedure of Example IV with the exception that there was included therein, and blended on the surface of the composition, 0.2 percent by weight of Aerosil R972. The resulting toner had a triboelectric negative charge of 14 microcoulombs per gram.

EXAMPLE VII

There was added to the developer composition of Example III uncharged toner particles consisting of 62 percent by weight of a styrene butylmethacrylate copolymer (58/42), 18 percent by weight of styrene acrylate copolymer, 10 percent by weight of a polyethylene wax, available as Viscol-550P, 8 percent by weight of Black Pearls L carbon black, and 2 percent by weight of the charge enhancing additive of Example I. The uncharged toner particles acquired a triboelectric charge of 15 microcoulombs per gram in 4 minutes.

The above procedure was repeated with the exception that the uncharged toner particles, as prepared in accordance with Examples V and VI, were added to the developer compositions as prepared in Examples V and VI. The admixed charging time was less than 30 seconds in each instance.

The developer compositions prepared in accordance with Examples III to VII were then incorporated into a xerographic imaging device containing therein a positively charged selenium photoreceptor. There resulted for 10,000 cycles images with no background deposits, and superior solids.

Other modifications of the present invention will occur to those skilled in the art based upon a reading of the disclosure of the present application and these modifications are intended to be included within the scope of the present invention.

What is claimed is:

1. A negatively charged toner composition comprised of resin particles, pigment particles, and as a charge enhancing additive an iron complex compound of the following formula:

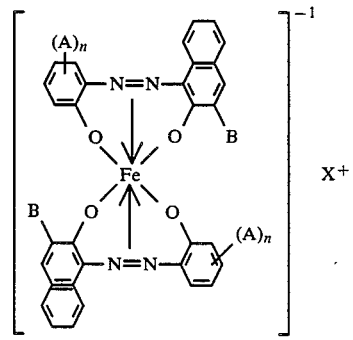

wherein A is independently selected from the group consisting of hydrogen, alkyl substituents, halogen, nitro, and alkoxy; n is the number 1, 2 or 3; X is a cation; and B is of the formula

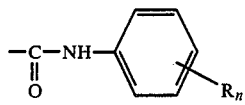

wherein R is selected from the group consisting of hydrogen, alkyl, halogen, nitro, and alkoxy; and n is as defined herein.

2. A toner composition in accordance with claim 1 wherein the alkyl substituent is from 1 to about 20 carbon atoms.

3. A toner composition in accordance with claim 1 wherein the alkyl substituent is methyl.

4. A toner composition in accordance with claim 1 wherein the halogen is chloride or fluoride.

5. A toner composition in accordance with claim 1 wherein the cation X is selected from the group consisting of hydrogen, sodium, potassium, ammonium, and substituted ammonium.

6. A toner composition in accordance with claim 1 wherein the cation is hydrogen.

7. A toner composition in accordance with claim 1 wherein the iron complex is present in an amount of from about 0.25 percent by weight to about 5 percent by weight.

8. A toner composition in accordance with claim 1 wherein the iron complex is present in an amount of from about 1 percent by weight to about 5 percent by weight.

9. A toner composition in accordance with claim 1 wherein X is sodium.

10. A toner composition in accordance with claim 1 wherein the resin particles are comprised of styrene polymers, or mixtures thereof.

11. A toner composition in accordance with claim 10 wherein the styrene polymer is styrene butylmethacrylate.

12. A toner composition in accordance with claim 1 wherein the resin paticles are comprised of a polyester.

13. A toner composition in accordance with claim 1 wherein the pigment particles are carbon black.

14. A developer composition comprised of the toner composition of claim 1 and carrier particles.

15. A developer composition in accordance with claim 14 wherein the carrier particles are comprised of ferrites.

16. A developer composition in accordance with claim 14 wherein the carrier particles are comprised of an iron powder.

17. A developer composition in accordance with claim 14 wherein the carrier particles consist of a core with a coating thereover.

18. A developer composition in accordance with claim 14 wherein the coating is comprised of a methyl terpolymer.

19. A developer composition in accordance with claim 14 wherein the alkyl substituent on the charge enhancing iron complex is from 1 to about 20 carbon atoms.

20. A developer composition in accordance with claim 14 wherein the alkyl substituent is methyl.

21. A developer composition in accordance with claim 14 wherein the cation X on the charge enhancing iron complex is hydrogen or sodium.

22. A developer composition in accordance with claim 14 wherein the resin particles are comprised of styrene polymers, or mixtures thereof.

23. A developer composition in accordance with claim 14 wherein the additive particles are present in an amount of from about 0.25 percent by weight to about 5 percent by weight.

24. A developer composition in accordance with claim 14 wherein from about 1 percent by weight to about 5 percent by weight of additive particles are present.

25. A method of imaging which comprises formulating an electrostatic latent image on a positively charged photoreceptor; affecting development thereof with the toner composition of claim 1; and thereafter transferring the developed image to a suitable substrate.

26. A method of imaging in accordance with claim 25 wherein the transferred image is permanently fixed to the substrate.

27. A method of imaging in accordance with claim 25 wherein the alkyl substituent for the iron complex charge enhancing additive contains from 1 to about 20 carbon atoms.

28. A method of imaging in accordance with claim 25 wherein the cation X for the iron complex charge enhancing additive is hydrogen or sodium.

29. A method of imaging in accordance with claim 25 wherein the resin particles are comprised of styrene polymers, or mixtures thereof.

30. A method of imaging in accordance with claim 25 wherein the pigment particles for the toner composition are carbon black.

* * * * *